United States Patent
Drunen et al.

(10) Patent No.: US 6,572,915 B1
(45) Date of Patent: Jun. 3, 2003

(54) PROCESS FOR ENRICHING FOODS AND BEVERAGES

(75) Inventors: Jeffrey Van Drunen, South Holland, IL (US); Jovan T. Hranisavljevic, Belgrade (YU)

(73) Assignee: VDF Futurceuticals, Momence, IL (US)

( * ) Notice: Subject to any disclaimer, the term of this patent is extended or adjusted under 35 U.S.C. 154(b) by 56 days.

(21) Appl. No.: 09/606,094

(22) Filed: Jun. 27, 2000

(51) Int. Cl.[7] .............................. A23B 7/00; A23B 9/00; A23F 5/00
(52) U.S. Cl. ................. 426/594; 426/425; 426/431; 426/430; 426/432; 426/541; 426/542; 426/615
(58) Field of Search ................... 426/594, 431, 426/425, 430, 432, 541, 542, 615

(56) References Cited

U.S. PATENT DOCUMENTS 4,867,992 A * 9/1989 Boniello et al.

FOREIGN PATENT DOCUMENTS

DE 2227875 * 1/1974
DE 2227879 * 1/1974

OTHER PUBLICATIONS

Database abstract. Derwent. SU 1709976. Published Feb. 1992. Inventor: Kononov et al.*

* cited by examiner

Primary Examiner—Anthony J Weier
(74) Attorney, Agent, or Firm—Rutan & Tucker LLP; Robert Fish

(57) ABSTRACT

A method of enriching fruit products and coffee with beneficial agents present in processing waste products such as fruit skins and kernels and coffee cherries. The waste products are dried and extracted with an appropriate organic solvent and/or water. The extract is dried, purified if desired, and blended into the food product corresponding to the waste product, such as a fruit processing waste product extract could be combined with fruit juices, canned or frozen fruit, etc., and coffee cherry extract could be combined with ground or freeze-dried coffee. The extracts contain highly beneficial antioxidants and potentially other beneficial agents.

15 Claims, 1 Drawing Sheet

PROCESS FOR ENRICHING FOODS AND BEVERAGES

FIELD OF THE INVENTION

This invention relates to the enrichment of foods and beverages with added naturally occurring agents and to methods of preparing such agents from waste products generated in agricultural food processing.

BACKGROUND OF THE INVENTION

Many different crops are grown, harvested and processed into foods, beverages, nutritional supplements and the like. Large quantities of agricultural waste products are generated during crop processing. Typically, these include fruit skin and pits resulting from fruit crops such as peaches, apricots, cherries, plums, etc. or the "coffee cherry" husks that are removed from coffee beans in the processing of coffee. Disposing of these waste products can cause serious environmental problems. Such waste products are generally incinerated, sometimes as auxiliary energy sources, or buried in landfills.

In the past no significant use has been developed for coffee cherries. Generally, coffee cherry pulp is simply disposed in a land fill. Uses exist for only a small portion of the fruit processing waste material.

Many of these waste products are very rich in useful ingredients, in particular in antioxidants that protect the seed from being damaged by a variety of naturally occurring free radicals and/or ultraviolet and other radiation to which the plants are exposed during the growing season. Using these waste products in foodstuffs and the like has been hampered by the presence of significant quantity of ingredients that protect the plant from their natural environmental enemies. These "natural pesticides" may be toxic to humans as, for example tomatine in tomato skin and solanine in potato skin. Also, some synthetic pesticide residues may well be present in the waste products. These problems make recycling the waste into food products difficult, if not impossible.

Thus, there is a continuing need for methods of reducing the amount of waste generated in growing and processing foodstuffs, that will recover valuable agents, such as antioxidants, that are present in agricultural waste and that will improve the quality and nutritional content of the foodstuffs, the processing of which generated the waste.

SUMMARY OF THE INVENTION

The above-noted problems, and others, are overcome in accordance with this invention by a process that basically includes selective extraction of antioxidants and other useful natural products from agricultural waste and returning them to the food product, drink or nutritional supplement that generated the wastes during agricultural crop processing.

While any suitable agricultural waste can be used in this novel process, it is particularly applicable to coffee cherries (the pulp that remains after removal of coffee beans). Waste, such as skins and pits remaining from processing fruit such as peaches, apricots, plums, citrus, bananas, etc., may also be processed in accordance with this invention. Of particular interest is the recovery of antioxidants and the reintroduction of the antioxidants into the finished product that generated the waste.

In the case of coffee cherries, caffeine can be recovered from the coffee cherry waste and used for other purposes such as in soft drinks, pharaceuticals, etc. Antioxidants recovered from coffee cherries can be beneficially added to coffee, such as ground coffee or freeze-dried coffee.

Antioxidants recovered from fruit waste can be added to the fruit product, such as fruit drinks, canned or frozen fruit, etc. The final product is thus entirely natural, containing only ingredients present in the crop as harvested. In order to prevent pesticide residue from passing with the beneficial ingredients, the crop should be grown without use of pesticides. In some cases it may be possible to completely remove all pesticide residue.

Typical antioxidants that are recovered include proanthocyanidins, catechin, epicatechin, chlorogenic acid, ferulic acid, caffeic acid, and various polyphenols. In addition to antioxidants, other natural products present in the waste can be recovered and reintroduced, such as various vitamins (e.g., vitamin C, vitamin E), oligo-saccharides, poly-saccharides and amino acids.

In general, the waste products are in the form of a wet mass, typically wet coffee cherry pulp, wet skins and kernels from various fruit, etc. This mass is dried at low temperature, typically room temperature, to avoid any thermal degradation of the material. Preferably, the waste material is initially dried to a low moisture mass. Typically, the material is pressed, such as in a continuous belt filter press to remove most of the water, leaving the pressed materials with a moisture content typically of about 20 wt %.

The pressed and at least partially dried raw material is then directly extracted with water or an organic solvent that is partially miscible with water at room or slightly elevated temperature, up to about 100° C. Some organic solvents and water form azeotropic mixtures suitable for azeotropic distillation (azeotropic removal of water).

After the desired agents are extracted, the water is removed from the extract, such as by vacuum drying or freeze-drying at a lower temperature, while the organic solvent (if used) is removed, usually by vacuum distillation, at a lower temperature to avoid thermal degradation of any of the extract's ingredients that may be sensitive to elevated temperatures.

Finally the antioxidants and any other extracted material are added back to the very same final food product as that generated the agricultural wastes. Thus, the final product will contain only natural material present in the original crop but will be enriched with antioxidants and other useful material that originally and naturally belong to the original crop. The final fruit juice, processed fruit, or coffee will be all natural but "healthier" than present similar products.

BRIEF DESCRIPTION OF THE DRAWING

Details of the invention, and of preferred embodiments thereof, will be further understood upon reference to the drawing which provides a block diagram of the steps in the process of this invention.

DETAILED DESCRIPTION OF PREFERRED EMBODIMENTS

Figure 1:
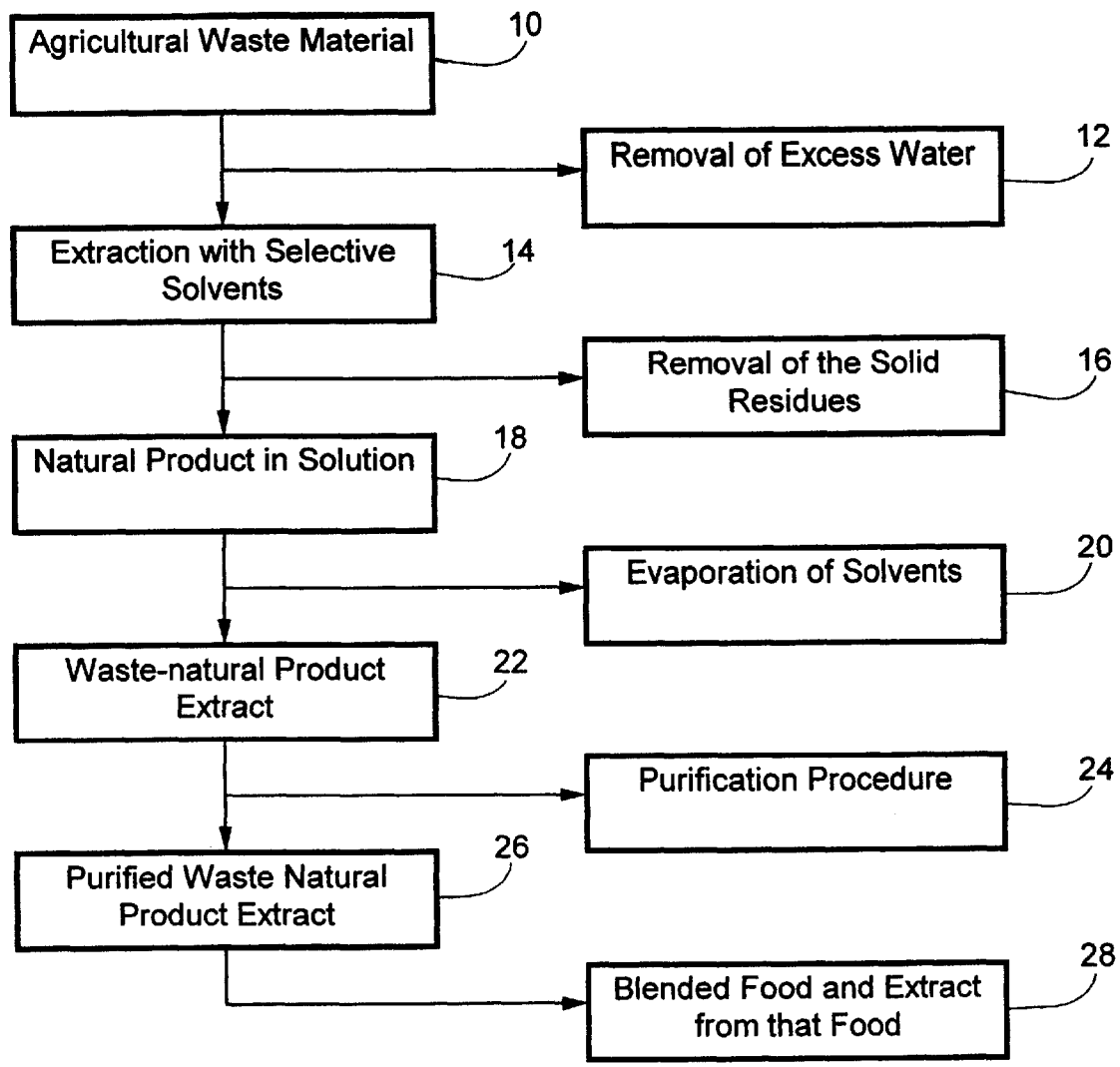

The process of this invention begins with receiving dry or wet waste agricultural crop waste material left after the food portion has been removed, as indicated in block 10. Typically, this waste material is the coffee cherry material left after coffee beans are removed. "Coffee cherries" is the common name for the soft husk material that surrounds coffee beans on a coffee tree. Other waste materials may be the seeds or pits and/or skins left after various fruits, such as cherries, peaches, plums and the like are processed into juice or canned or frozen fruit.

As indicated in block 12, excess water is removed from the waste material by any suitable method, such as pressing in a continuous belt filter press, centrifugation, etc. If additional water is to be removed, additional drying may be done at a temperature below any temperature that might degrade the waste material. For example, freeze drying may be desirable in some cases. Drum drying often is satisfactory since the contact time at elevated temperature is quite short.

Next, suitable solvents are applied to the waste material to extract the desired antioxidants and any other desired soluble constituent as indicated in block 14. Typically, water and/ororganic solvents such as ethyl acetate, ethanol, butanol or propanol are used. Solid dried waste is treated with about 5 to 20 times larger amounts of solvent or mixture of solvents while stirring at a constant temperature. The process is generally performed in stainless steel extractors. The contact time between solid waste and solvent is usually several hours, but can be widely varied depending on the nature of the ingredients to be extracted.

Next, the solid residues of the waste material are separated from the solvent and dissolved compounds by any suitable method, such as filtration or centrifugation as indicated in block 16.

The waste solution containing the antioxidants and other natural products is retained as indicated in block 18. If desired, some additional procedures may be performed on a primary extract. For example, if relatively moist agricultural waste is used as raw material, with butanol as the extraction solvent at about 90° C., the separated liquid extract will contain two layers at room temperature. The upper layer is mainly the butanol extract saturated with water and the lower layer is mainly water extract saturated with butanol. If desired, the two layers may be separated and each extract can be subjected to a different procedure.

The solvents are removed as indicated in block 20 leaving the natural product in an oil, semi-solid or solid state as indicated in block 22, depending on the different selected compounds extracted. The solvents may then be reused after a regeneration step, if needed.

If needed, the extract is purified as desired, as indicated in block 24. For example, by selective adsorption or selective extraction of an unwanted constituent, such as caffeine. The resulting purified natural product extract is ready for use or storage as indicated in block 26. While purification is often not necessary, in some cases different beneficial ingredients can be extracted by using two different solvent for to successive extractions. For example, with coffee cherries an initial extraction with only water as a solvent will extract the polyphenols. The coffee cherries can be dried and then extracted with butanol, which will extract polysacchrides. Alternatively, the coffee cherries can be extracted with a mixture of water and butanol. The extract is dried to form the extract of block 22 and will contain both polyphenols and polysacchrides. That extract can be purified by again extracting, using only water, which will extract only the polyphenols leaving a purified extract containing polysacchrides but not polyphenols.

This purified natural product is blended with the original food product from which the waste material was derived as indicated in block 28. For example, antioxidants, with other extracts if desired, derived from coffee cherries would be mixed with ground or freeze-dried coffee, extracts from peach processing would be mixed with peaches (typically frozen or canned peaches) or peach juice.

The following examples illustrate preferred embodiments of the process of this invention. Parts and percentages are by weight unless otherwise indicated.

EXAMPLE I

A quantity of wet coffee cherry pulp is dried on a filter belt to remove most of the water, then is subjected to a short drum drying process. The ratio of dried pulp to the original wet pulp is about 1:5. About 10 gr of the dried coffee cherry pulp is ground to a coarse powder. The powder is mixed with about 100 ml of distilled water and heated to about 60° C. with simultaneous magnetic stirring for about 1 hour. The mixture is centrifuged in an Eppendorf 5804R centrifuge at about 4000 rpm for about 15 minutes to produce a very clear supernatant. The supernatant is evaporated to dryness in a Büchi R-114 rotary evaporator, using a water bath temperature of about 60° C. and a vacuum of about 15 mm Hg. About 1.5 grams of a light yellow-brown powder results. An aliquot part is dissolved in water to produce a concentration of about 15 mg per ml. Upon testing by high pressure liquid chromatography, this is found to contain chlorogenic acid, ferulic acid, caffeic acid, proanthocyanidins, caffeine and other agents. These are determined as polyphenols by spectrophotometry uainf Folin-Ciocalteu's phenol reagents from Sigma. Additional quantities of the final extract are prepared in this manner and blended with ground coffee for consumption.

EXAMPLE II

About 100 ml ethyl acetate is saturated with water, about 2 ml at room temperature by vigorous shaking in a separatory funnel. About 10 gr of ground air-dried coffee cherries is mixed in the water saturated ethyl acetate. The mixture is heated to about 65° C. and held at that temperature for about 1 hour while stirring with a magnetic stirrer. The suspension is then filtered using a Buchner funnel. The filtrate is evaporated in a Büchi R-114 rotary evaporator at a vacuum of about 20 mm Hg. About 380 mg dry residue is produced. This dry residue is dissolved in about 20 ml of 80% ethanol. Any undissolved solid is removed by centrifugation. The final concentration, based on dry residue, is about 15 mg per ml. Beneficial agents as produced in Example I are again found in the extract. Additional quantities of the dry residue are dissolved in water and mixed with coffee which is freeze dried for consumption.

EXAMPLE III

About 10 g of ground dried coffee cherries is moistened with about 10 ml of 100 mM $KH_2PO_4$ in a flask by slowly adding, over about 30 minutes, about 10 ml of the $KH_2PO_4$ buffer solution to the ground coffee cherries while constantly rotating the flask. About 100 ml of dry ethyl acetate is then added and rotation is continued for about an hour at about 65° C. The flask is cooled to about room temperature and the mixture is filtered in a Buchner funnel. The filtrate is then evaporated to dryness in a vacuum as in Example I. The residue yield is about 340 mg. The residue is dissolved in 80% ethanol to produce a final concentration of about 15 mg/ml. The extract is mixed with ground coffee that is then freeze dried for consumption.

EXAMPLE IV

About 10 gr of ground air-dried coffee cherries is extracted with about 100 ml of butanol containing about 5% water. The mixture is maintained at about 65° C. for about 1 hour with constant stirring. The mixture is cooled to room temperature. The mixture is centrifuged at about 4000 rpm for about 20 minutes. Supernatant is poured off and the mixture is evaporated to dryness in a rotary evaporator, using a water bath temperature of about 55° C. at a vacuum of about 15 mm Hg. The yield is about 500 mg of dry residue. The residue is dissolved in 80% ethanol to produce a concentration of about 15 mg/ml. The extract is mixed with ground coffee, which is then dried for use.

EXAMPLE V

About 10 gr of ground air-dried coffee cherries is mixed in about 100 ml ethyl acetate. The mixture is heated to about 65° C. and held at that temperature for about 50 minutes while stirring with a magnetic stirrer. The suspension is then filtered using a Buchner funnel in a vacuum. The filtrate is evaporated in a rotary evaporator at a vacuum of about 20 mm Hg. About 0.24 gm of a solid extract is produced. This dry residue is dissolved in sufficient 80% ethanol to make an about 15 mg/ml solution. This extract is then added to brewed coffee for consumption

EXAMPLE VI

About 10 gr of finely ground dried plum skin and kernels is suspended in about 100 ml butanol. The suspension is magnetically stirred and maintained at about 67° C. for about 70 minutes. After filtration with a Buchner filter in vacuum, solvent from the filtrate is removed in a vacuum. The dried residue, about 1 gr, is added to a drink prepared from plum juice.

EXAMPLE VII

About 30 gr of finely ground dried orange skin is suspended in about 200 ml of ethanol. The suspension is stirred at about 75° C. for about 50 minutes. After filtration, solvent from the filtrate is removed by heating the filtrate to about 80° C. for about 50 minutes. The resulting o9ly residue is blended with dried orange flavored drink, which is then later reconstituted with water for consumption.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

We claim:

1. A method of enriching food products which comprises the steps of:
   providing waste material from processing an agricultural food product;
   extracting an antioxidant from said waste material with a solvent to produce an extract;
   then removing at least some insoluble particles from said extract;
   then removing at least some solvents from said extract; and
   then blending said extract with said agricultural food product;
   whereby a nutritional value of the extract is enhanced by the antioxidant.

2. The method according to claim 1 wherein said waste material consists of coffee cherries.

3. The method according to claim 1 where said waste material is in the form of water-containing wet pulp and including the further step of at least partially drying said waste material prior to said extracting step.

4. The method according to claim 1 wherein the antioxidant comprises Vitamin E.

5. The method according to claim 1 wherein said solvent comprises water and an alcohol.

6. The method according to claim 1 further including the step of purifying said extract after said solvents are removed by extracting said extract with a solvent that dissolves only predetermined ingredients in said extract to provide a purified extract containing only said predetermined ingredients.

7. A method of enriching a food product which comprises the steps of:
   providing wet waste material from processing an agricultural crop product;
   at least partially dying said waste material;
   extracting predetermined beneficial compounds from said waste material with at least one solvent to produce an extract;
   removing insoluble particles from said extract;
   removing solvents from said extract to produce a dry powdered extract;
   purifying said extract after said solvents are removed by extracting said extract with a solvent that dissolves only predetermined ingredients in said extract to provide a purified extract containing only said predetermined ingredients; and
   blending said extract with said agricultural crop product;
   whereby a nutritional benefit of ingesting the resulting enriched agricultural food product is improved without adding anything not originally in said agricultural crop product.

8. The method according to claim 7 wherein said waste material consists of coffee cherries.

9. The method according to claim 7 where said waste material is in the form of water-containing wet pulp and including the further step of at least partially drying said waste material prior to said extracting step.

10. The method according to claim 7 wherein said extract comprises antioxidants.

11. The method according to claim 7 wherein said solvent comprises water and an alcohol.

12. A method of enriching coffee, which comprises the steps of:
   providing a quantity of coffee fruit;
   processing said coffee fruit to separate coffee cherries from coffee beans;
   extracting compounds comprising antioxidant compounds from said coffee cherries with at least one solvent to provide a mixture comprising said at least one solvent and said extracted compounds;
   removing solid particles from said mixture;
   removing said at least one solvent to provide an extract; and
   blending said extract with said processed coffee beans;
   whereby said processed coffee beans consist substantially only of substances not originally in said coffee fruit.

13. The method according to claim 12 wherein said extract comprises antioxidants.

14. The method according to claim 12 wherein said solvent comprises water and an alcohol.

15. The method according to claim 12 further including the step of purifying said extract after said solvents are removed by extracting said extract with only one of said water and alcohol whereby the resulting purified extract contains less than all of the ingredients present in said extract.

\* \* \* \* \*